United States Patent Office 3,208,430
Patented Sept. 28, 1965

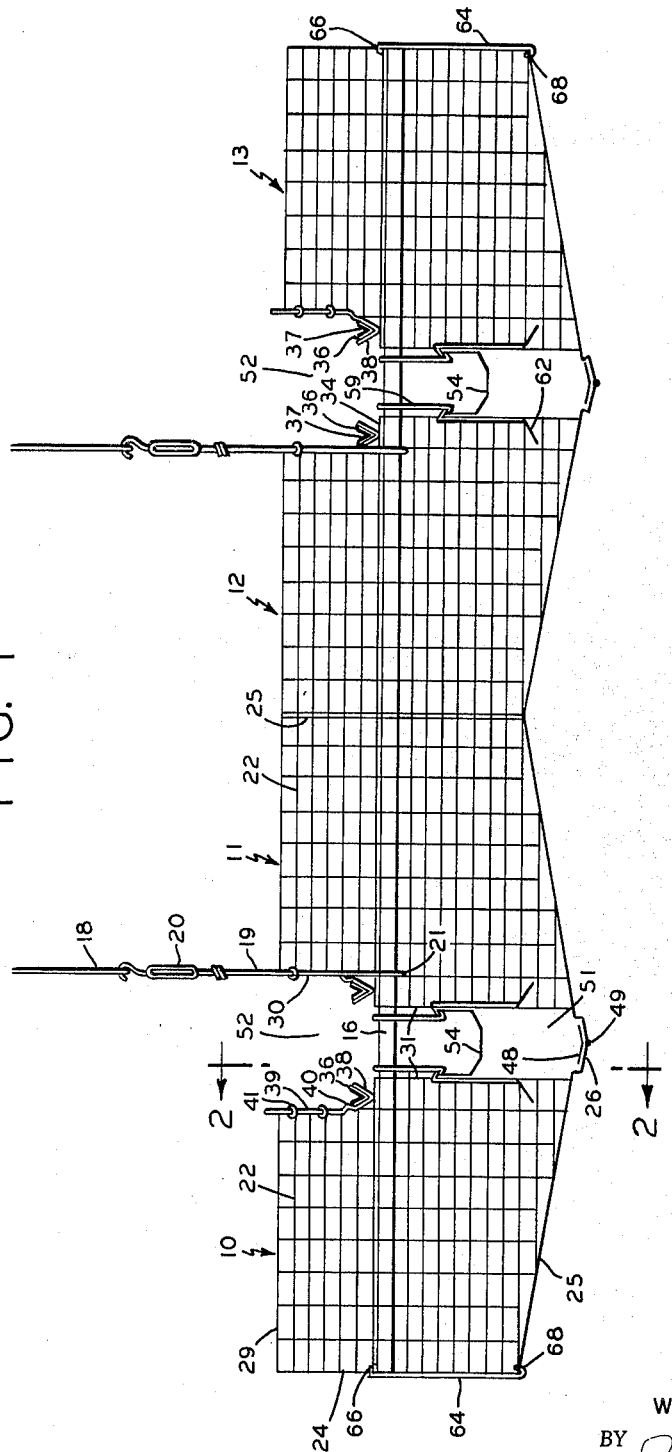

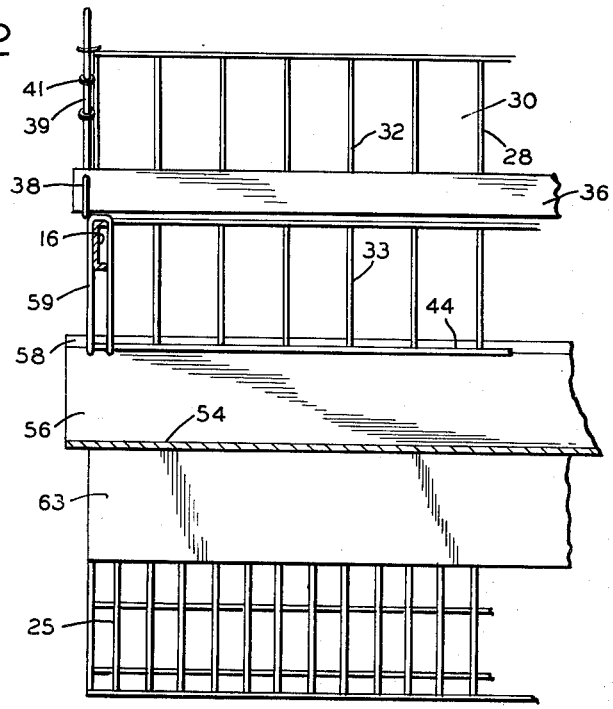
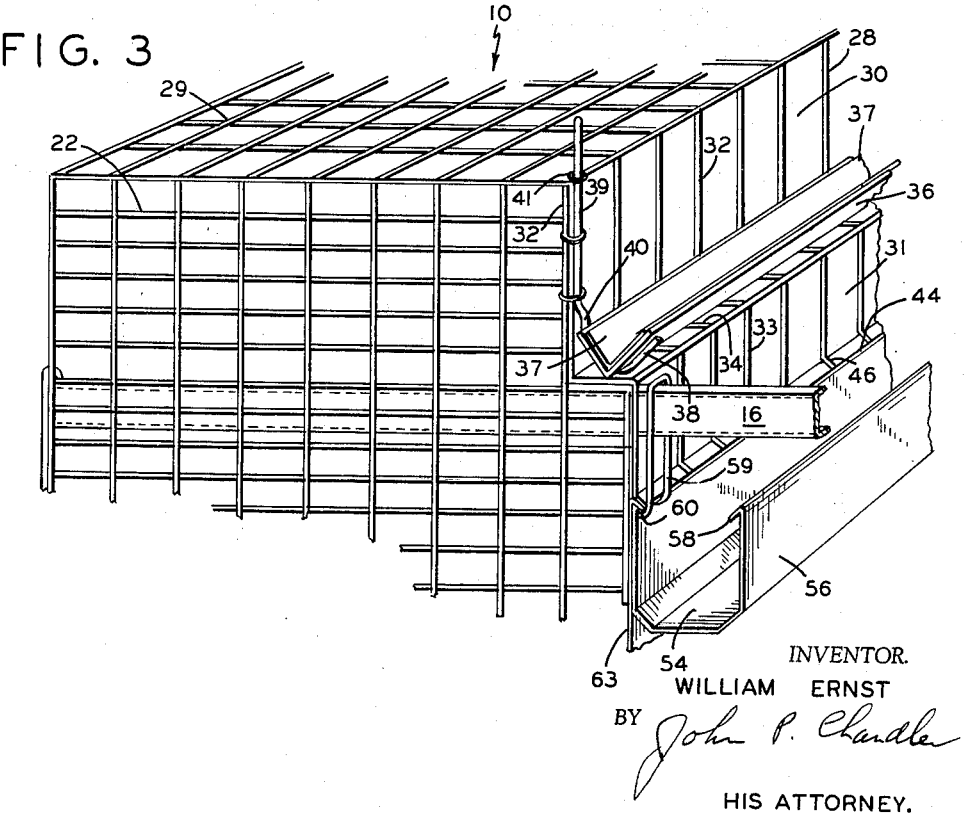

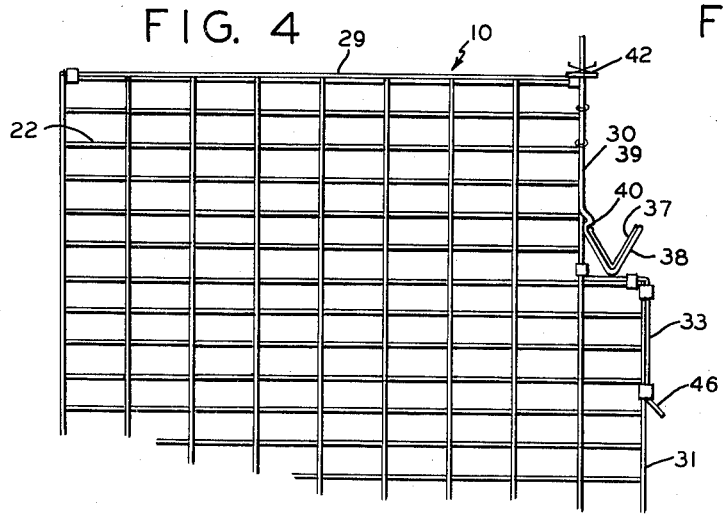
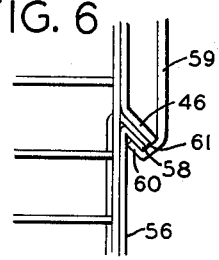
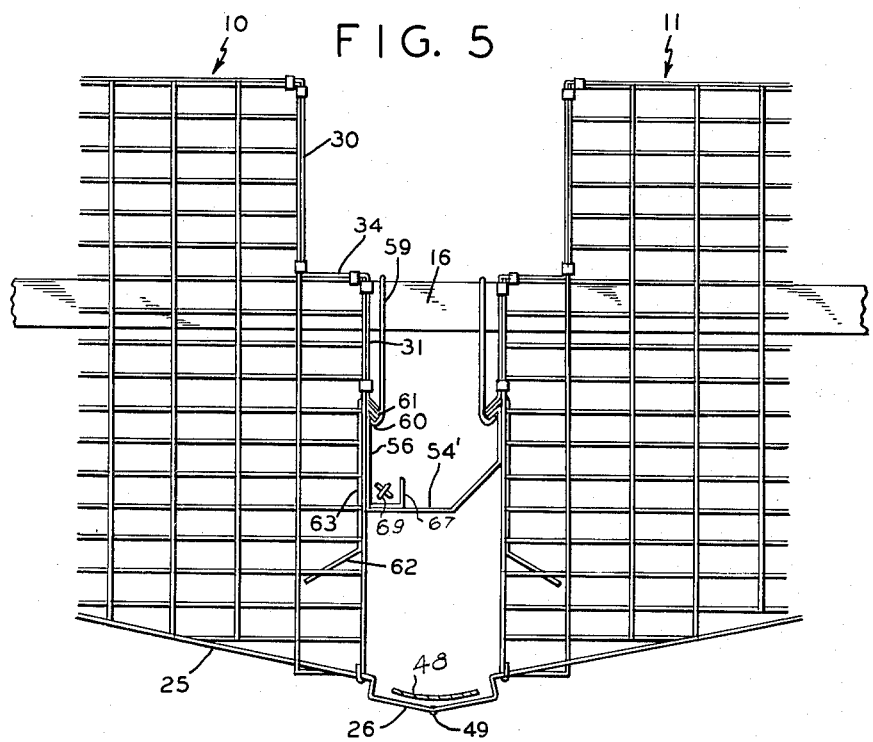

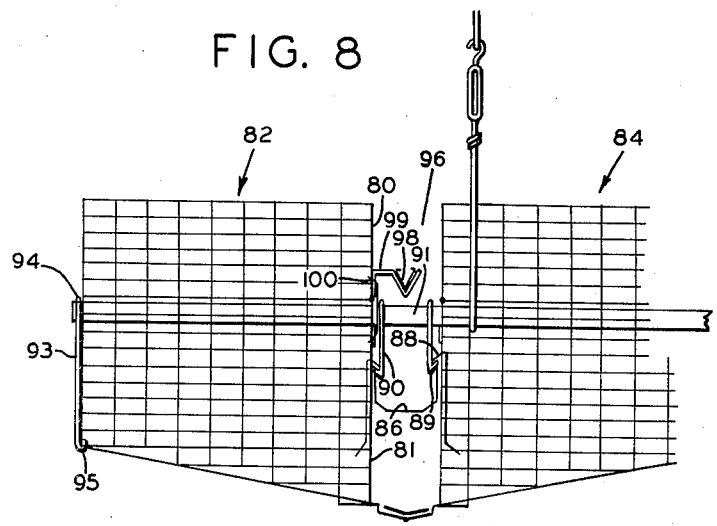
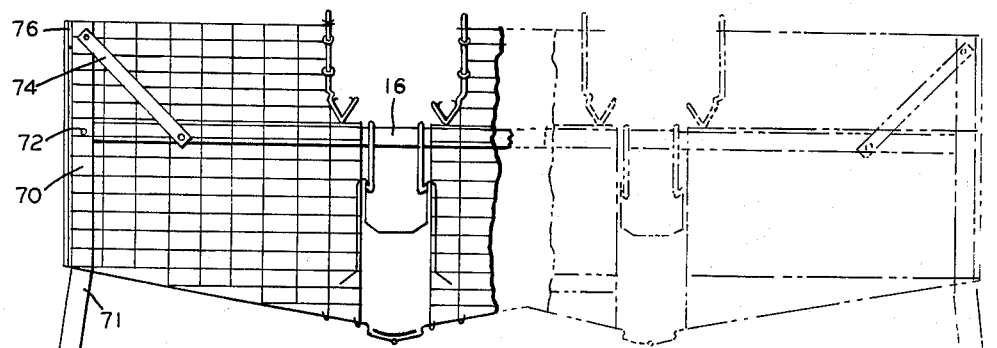
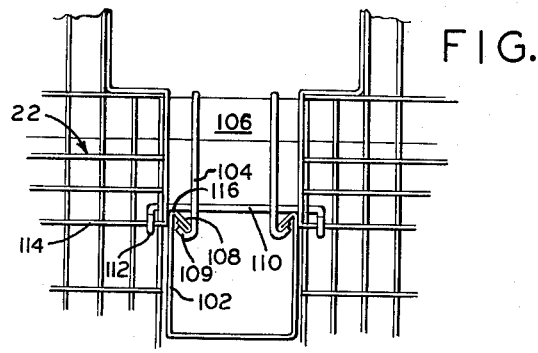

3,208,430
LAYING CAGE STRUCTURE
William B. Ernst, Owatonna, Minn., assignor to The National Ideal Company, Hicksville, Ohio, a corporation of Ohio
Filed Jan. 27, 1964, Ser. No. 340,384
12 Claims. (Cl. 119—18)

This invention relates to laying cages for poultry and relates more particularly to a novel cage structure comprising a plurality of parallel rows of confining cages wherein each pair of rows has a relatively narrow space or aisle therebetween to receive feeding and watering troughs and an egg conveyor, and wherein the major portion of the weight of the rows of cages is supported by the feed trough which itself is suitably supported from the ceiling or by legs extending up from the floor.

An important object of the invention is to provide an improved cage suspension assembly wherein a channel or beam extends transversely of the rows at suitably spaced intervals, the feed trough is suspended from these beams and the major portion of the weight of the cages is in turn carried by the feed trough itself. This arrangement permits the cages to be constructed from lighter gauge open wire grill screening that is customarily employed and also permits the fabrication and construction without the use of nuts and bolts or welding.

Another object of the invention is to provide a multiple row cage arrangement which is lighter in weight and easier to keep clean than ordinary cages. The feeding space or aisle between each pair of adjoining rows has in its upper section the watering trough and in its lower section the feed trough extending the length of the space, with the transverse beam disposed on a plane located between the two. This positioning prevents the beams from being fouled by the hens and also provides unobstructed access to the watering trough from above for the purpose of cleaning the trough, which two advantages would not be achieved if the beams were located in any other position.

This transverse beam assembly and the suspending of the cage-supporting watering troughs from the beams is more advantageous if there are two pairs of parallel rows with the cage-supporting troughs between the first and second and also between the third and fourth rows, since it gives better balance to the structure, especially if the beams are supported from the ceiling, which is preferable.

Another very significant advantage in the four row assembly is in the fact that it permits an endless chain feeder to be used, the chain traveling on one plane, up one row and down the other, and the chickens in the cage on opposite sides of each feeding space or aisle eat from one feeding trough. Also, the ceiling suspension arrangement gives a clear and unobstructed area below the cage assembly for easy cleaning. If, on the other hand, legs are preferred, a single pair of rows achieves many of the advantages of the invention.

Another object of the invention is to provide improved supporting means for rows of cages by forming the front wall of each row, i.e., the wall facing the aisle, with a lower edge which rests upon the upper edge of the feed trough. The front wall extends from the cage top only about half way to the bottom wall and the balance of the front is closed by a sheet metal curtain also hung from the upper edge of the feed trough. The outside or rear longitudinal walls are suspended at the outer ends of the beams, thus avoiding any marked stress on any of the walls and further contributing to rigidity of the structure without the need for heavy wire mesh construction.

Still another object of the invention is to provide a laying cage unit which can be shipped flat and be readily assembled and disassembled should the occasion arise.

In the drawings:

FIGURE 1 is an end elevation of a cage unit embodying the present invention;

FIGURE 2 is a broken elevation of the front wall of each row of cages;

FIGURE 3 is a broken perspective view showing the end, top and front wall of a row of cages;

FIGURE 4 is an enlarged broken view showing such details of the manner in which the cages are supported by the feed trough;

FIGURE 5 is another enlarged broken view and showing a modification in the construction of the feed trough;

FIGURE 6 is an enlarged broken view showing the details at the point of support;

FIGURE 7 is a broken end elevation showing the cage units mounted on legs; and

FIGURE 8 is a broken end elevation of two rows of cages of slightly modified construction.

FIGURE 9 shows a further modification.

The end elevation of FIGURE 1 shows four rows of cages 10, 11, 12 and 13, rows 10 and 13 of which, and rows 11 and 12 of which, are each identical in construction except that they are reversely arranged. All four rows are supported by iron channels 16 which have a beam-like function and which are disposed transversely of the rows and are positioned about every four feet, each cage being about one foot in width.

In one embodiment of the invention the channels, and hence the rows of cages, are supported from the ceiling by means of upper and lower rods 18 and 19 with a turnbuckle assembly 20 between the rods. The upper rod is secured in fixed relation at the ceiling (not shown) and the lower rod has a hook 21 at its lower end which extends around and which supports the horizontal channel.

The cage walls are of open wire grill construction and they include an end wall 22, a rear wall 24 extending the full length of the unit, which may be as much as 100 ft. in length, depending upon the size of the building. The end walls 22 in rows 11 and 12 may be made from a single length of wire mesh and a continuous rear wall 25 extends between these rows.

It also includes a continuous bottom wall or floor 25 which extends forwardly of the cages one half the width of the space between rows 10 and 11, as shown, at 26, and transverse partitions 28 (FIGS. 2 and 3) dividing the rows into individual cage units. Finally, it includes a top wall 29 and a front wall comprising an upper, inwardly recessed section 30 and a lower section 31 disposed forwardly of the upper section. The upper section is composed of spaced vertical wires 32 and the lower section is formed of wires 33 and between the two there are horizontal sections 34, thus forming a ledge on which a V-shaped water trough 36 is located and is held in place by wire brackets, each having a lower V-shaped section 38 and an upper vertical section 39 with an offset portion 40 between the sections which engage the upper edge of the trough and secure it in the bracket.

The upper section 39 is secured to one of the wires 32 by means of rings 41. This water trough may have a removable liner 37 of clear transparent plastic material. The vertical section 39 of the bracket may be made vertically adjustable by means of sheet metal grip nuts 42 (FIG. 4). This adjustability is necessary so as to give the water trough a slope sufficient to cause water to run from end to end in order to assure a clean supply.

The wires 33 in the lower front wall section extend downwardly only about one quarter the distance between ledge and the bottom of the cage. A horizontal wire 44 connects the lower ends of the vertical wires and the last ½ inch or thereabouts of this open wire mesh wall is bent forwardly at 46 at an angle of about 45° for a purpose to be described.

The lower wall 25 of the cages in rows 10 and 11 are continuous for the full length of the row and these floors are inclined downwardly at an angle of about 15° from the horizontal to cause the eggs to roll down to a belt egg conveyor 48 carried on a wire mesh support composed of forwardly extending sections 26 of the bottom walls in rows 10 and 11 which sections are secured in abutting relation as by means of rings 49.

There is thus formed a space or aisle 51 between the the lower ends of the opposed front walls between rows 10 and 11 and a space 52 of a greater width between the upper ends thereof. A feed trough 54 formed of sheet metal and of special configuration extends the full length of the lower space. This feed trough is of channel shape with opposed vertical walls 56 whose upper edges are bent inwardly at an angle of 45° to form a continuous hook-like lip 58. The bottom wall may have a conveyor (not shown) to supply the feed uniformly over its entire length.

This feed trough performs an important function in addition to dispensing food, in that it actually supports the cage units. Inverted U-shaped wire brackets 59 extend over the top of channels 16 and are bent upwardly at their lower ends to form hooks 60 which are received under lip 58 at the upper ends of the feed trough. Thus the feed trough is firmly supported by the horizontal channels. It was earlier pointed out that front walls 31 extend downwardly only about ¼ the distance from horizontal section 34 to the lower wall 25. A portion of the distance below lower edge 44 is closed by side walls 56 of the feed trough, thus leaving a fairly large open vertical area below the feed trough. To prevent chickens from pecking the eggs on the conveyor, a barrier formed of sheet metal or other material has a vertical section 63 and an upper lip 61 disposed at an angle of 45° to the vertical which is hung on lip 58. It also includes a lower diagonal section 62 extending into the cage area. This latter section has two functions; one, to prevent chickens from pecking the eggs and; two, to prevent water and food from falling on the egg conveyor.

While the cage units are made from relatively small gauge wire screening, they nevertheless have a considerable measure of rigidity and the four rows of cages are supported almost entirely by the four inverted U-shaped hooks 59 which support the feed trough from the transverse channels. The only additional supports for the outer rows 10 and 13 of the cage units is a rod 64 having a hook 66 at its upper end which passes through a hole at the end of channel 16 and a lower hook 68 which engages the lower corner section of the rear wall 24.

FIG. 5 shows a modification in the feed trough 54' where the lower wall has a shallow partition 67 with a chain 69 movable therein to transport the feed uniformly the entire length of the trough.

In some installations it will not be feasible to suspend the cage unit from the ceiling and FIGURE 7 shows the slight modification required to mount the cages on legs shown at 70. The lower ends of these legs are offset rearwardly at 71 to prevent fouling. The leg is secured to the end of the channel 16 by a bolt 72 and to rigidly secure the legs in a vertical position, a diagonal brace 74 connects the upper end of the leg with the channel. The legs may be connected by a flat bar 76 which supports the rear margin of the upper wall. The leg 71 and the beam 16 are inside the cage and the diagonal brace 74 is on the outside of the cage with the wires clamped firmly therebetween. The structure of FIGURE 7 is otherwise like that shown in FIGURE 1.

In the modified arrangement of FIGURE 8, the upper front wall section 80 is not recessed as in the earlier embodiments but is on the same vertical plane as the lower front wall section 81. The two rows 82 and 84 are supported as in FIGURE 1 by the feed trough 86 which has the diagonal lips 88 which receive the hook shaped terminals 89 of the wire brackets 90 suspended from the beam 91.

As in FIG. 1, the major portion of the weight of the rows of cages rests upon the lips at the upper edges of the feed trough 86 which trough is suspended from beams 91. There is, however, the bar 93 having a hook 94 at its upper end connected with beam 91 and having a hook 95 at its lower end which engages the rear wall of the cages. In view of the narrow area at the upper end 96 of the aisle between the front rows of cages only one watering trough is necessary for both rows 82 and 84. This trough is supported by brackets 99 which are secured to one of the front walls by clips 100.

A further modification is shown in FIG. 9 wherein the feed trough 102 is again supported by wire bracket 104 suspended from transverse beam 106. The upper lip 108 of the feed trough in this instance is shown as being bent double for added strength and it is received in the lower V-shaped terminal 109 of the bracket. Instead of the forwardly bent diagonal edge 46 of the front wall, a wire clip 110 having downwardly extending V-shaped terminals 112 is attached at its ends to two horizontal wires 114 of end wall 22 and the clip is mounted on the top edge 116 of the lip.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A laying cage structure for poultry and including at least one pair of parallel rows of cages of open wire grill construction and having a narrow aisle between each pair of rows, front walls facing the aisle and extending from the top downwardly over a portion of the depth of the rows, a plurality of spaced beams extending transversely of the rows and across the aisle between the upper and lower ends thereof, a generally U-shaped watering trough supported by the cages in the aisle above the beams and a feed trough in the aisle below the beams, spaced brackets extending down from the beams for supporting the feed trough, the lower edges of the front longitudinal walls of the rows facing the aisle resting upon and being supported by the upper edges of said feed trough, and means for supporting said beams in a building having a floor so that the cage structure is spaced above said floor.

2. A laying cage structure for poultry and including a plurality of pairs of parallel rows of cages of open wire grill construction and having a narrow aisle between each pair of rows, front walls facing the aisle and extending from the top downwardly over a portion of the depth of the rows, a plurality of spaced beams extending transversely of the rows and across the aisle between the upper and lower ends thereof, a watering trough extending over the length of the aisle supported by a cage above the beams and a feedtrough in the aisle below the beams, spaced brackets extending down from the beams for supporting the feed trough, the lower edges of the front longtiudinal walls of the rows facing the aisle being supported by the upper edges of said watering trough, means connecting the rear longitudinal walls of the rows with the ends of the beams, and means for supporting said beams in a building having a floor so that the cage structure is suspended above said floor.

3. The structure recited in claim 2 wherein the upper edges of the watering trough have diagonal lips thereon and said lower edges of the front longitudinal walls are diagonally inclined and rest upon said lips.

4. The structure recited in claim 2 wherein the rows of cages have lower walls which are inclined downwardly towards the center of the aisle and are joined at said center to form a support for an egg conveyor.

5. The structure recited in claim 4 wherein a movable egg conveyor is carried on said support.

6. The structure recited in claim 2 wherein an imperforate barrier is also supported by said upper edges of the feed trough and closes the lower section of the front of the rows.

7. The structure recited in claim 2 wherein the supporting means for the cages are wires extending to the ceiling of the building.

8. The structure recited in claim 2 wherein the supporting means for the cages are legs extending up from the floor of the building.

9. The structure recited in claim 2 wherein the upper sections of said front walls are recessed rearwardly.

10. A laying cage structure comprising four parallel rows of cages of open wire grill construction with aisles between the first and second and between the third and fourth rows and lower walls inclined downwardly towards and extending into said aisles, forming an egg conveyor support, and a conveyor on said support, transverse partitions dividing the rows into individual cages, the front wall of the rows facing said aisles being formed of spaced vertical wires and having an upper, rearwardly recessed section and a watering trough supported therein, a shallow lower section whose lower end is bent outwardly to form an angular lip, a feed trough whose upper edges receive and support said angular lips and closing a portion of the opening lying below the lip, a barrier also supported by said lip and extending downwardly to a point spaced above said lower cage wall, a transverse beam passing through the cages between the feed trough and the watering trough and provided with means supporting the same in spaced relation to the floor, and brackets extending from the beam down to a position below the feed trough lips to support said troughs.

11. A laying cage structure comprising four parallel rows of cages of open wire grill construction with aisles between the first and second and between the third and fourth rows and lower walls inclined downwardly towards and extending into said aisles, forming an egg conveyor support, transverse partitions dividing the rows into individual cages, the front wall of the rows facing said aisles being formed of spaced vertical wires and having an upper section and a watering trough supported thereon, a shallow lower section whose lower end is bent outwardly to form an angular lip, a feed trough whose upper edges receive and support said angular lips and closing a portion of the opening lying below the lip, a barrier also supported by said lip and extending downwardly to a point spaced above said lower cage wall, a transverse beam passing through the cages between the feed trough and the watering trough and provided with means supporting the same in spaced relation to the floor, and brackets carried by the beams and having hooks at their lower ends which underlie the feed trough lips to support said troughs.

12. A laying cage structure for poultry and including a plurality of parallel rows of cages of open wire grill construction and having a narrow aisle between each pair of rows, a plurality of spaced beams extending transversely of the rows and across the aisle midway between the upper and lower ends thereof, a watering trough in the aisle above the beams and a feed trough below the beams, spaced hangers extending down from the beams supporting the feed trough, wire brackets secured at their ends to the longitudinal front walls of the cages facing the aisle, said brackets resting upon and being supported by said feed trough.

References Cited by the Examiner

UNITED STATES PATENTS

| | | | |
|---|---|---|---|
| 2,756,721 | 6/56 | Hayes | 119—48 |
| 2,851,990 | 9/58 | Rowland | 119—21 X |
| 2,863,418 | 12/58 | Pockmann | 119—18 |
| 2,946,309 | 7/60 | Page | 119—22 |
| 2,987,038 | 6/61 | Cole | 119—18 |
| 3,160,141 | 12/64 | Crutchfield | 119—22 |

SAMUEL KOREN, *Primary Examiner.*

ALDRICH F. MEDBERY, *Examiner.*